(12) United States Patent
Li

(10) Patent No.: US 8,231,395 B2
(45) Date of Patent: Jul. 31, 2012

(54) CARD CONNECTOR WITH LOCKING MECHANISM

(75) Inventor: Gen-Lao Li, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 205 days.

(21) Appl. No.: 12/818,152

(22) Filed: Jun. 18, 2010

(65) Prior Publication Data

US 2010/0323543 A1    Dec. 23, 2010

(30) Foreign Application Priority Data

Jun. 18, 2009    (CN) .......................... 2009 2 0304638

(51) Int. Cl.
*H01R 13/62* (2006.01)
(52) U.S. Cl. ........................................ 439/159; 439/630
(58) Field of Classification Search .................. 439/155, 439/159, 160, 377, 630
See application file for complete search history.

(56) References Cited

U.S. PATENT DOCUMENTS

| 6,773,280 | B2 * | 8/2004 | Sasaki et al. | 439/159 |
|---|---|---|---|---|
| 7,118,394 | B2 * | 10/2006 | Yoneyama et al. | 439/159 |
| 7,309,245 | B2 * | 12/2007 | Sadatoku | 439/159 |
| 7,361,035 | B1 * | 4/2008 | Lai | 439/155 |
| 7,651,351 | B2 * | 1/2010 | Yen et al. | 439/159 |
| 7,658,638 | B2 * | 2/2010 | Motojima | 439/377 |
| 7,708,575 | B2 | 5/2010 | Motojima | |

FOREIGN PATENT DOCUMENTS

CN    201075484    6/2008

* cited by examiner

*Primary Examiner* — Thanh Tam Le
(74) *Attorney, Agent, or Firm* — Wei Te Chung; Andrew C. Cheng; Ming Chieh Chang

(57) ABSTRACT

An electrical card connector (100), used for receiving a card having a cutout, includes an insulating housing (2), a plurality of conductive contacts (3) retained in the insulating housing, a metal shield (1) covering the insulating housing to define a card receiving room (10), and an ejector (4) assembled on the insulating housing. The ejector includes a slider (41), a spring member (42), and a pin member (46) for cooperatively guiding/ejecting the card. The electrical card connector further includes a half lock elastic piece (43) and a flexible piece (48) both secured to the slider of the ejector. The half lock elastic piece partly extends toward the card receiving room for engaging with the card. The flexible piece has a wing portion (481) pressing against the half lock elastic piece from an opposite side relative to the card receiving room throughout the card's insertion/ejection.

8 Claims, 4 Drawing Sheets

CARD CONNECTOR WITH LOCKING MECHANISM

BACKGROUND OF THE INVENTION

1. Field of the Invention

The present invention relates generally to a card connector, and more particularly to a card connector with locking mechanism for keeping an inserted card along a right direction during its insertion and holding the card in the card connector at a right position when the card is fully inserted.

2. Description of Related Arts

An electrical card is widely used in an electronic product, such as a mobile phone, a digital camera, a notebook PC or etc. Usually, a card connector is arranged in the product, and the electrical card is inserted into the card connector for electrically connecting with a printed circuit board to transit signals therebetween. A locking mechanism, commonly being a half lock elastic piece, is mounted in the card connector for engaging with the electrical card. However, a single piece of half lock elastic piece seems very weak, resulting in the electrical card's instability in the card connector.

Chinese Patent No. 201075484 discloses an electrical card connector improving stability of the electrical card therein. The electrical card connector comprises an insulating body, a plurality of conductive terminals, a pair of elastic switch terminals, an ejector, and at least one shielding shell. The ejector comprises a half lock elastic piece locking with a cutout of an inserted card when the card is fully inserted. The shielding shell is provided with a blocking elastic piece used for withstanding the half lock elastic piece of the ejector, so as to prevent the card from flying out of the card connector in the ejecting process. The shielding shell is also provided with a withstanding piece behind the blocking elastic piece along the card's insertion direction, used for withstanding a projecting part on the periphery of the half lock elastic piece, thereby preventing the card from abnormal breaking away. The withstanding piece always keeps a certain distance away from the blocking elastic piece. At a position between the withstanding piece and the blocking elastic piece, the half lock elastic piece undertakes pressure from neither the withstanding piece nor the blocking elastic piece, and therefore, the half lock elastic piece is slightly released from the cutout of the card. Therefore, a user senses a changeful force during the card's ejection, which gives misconception to the user that the card is fully ejected, but it is not the case in fact. When the card is ejected to the position between the blocking elastic piece and the withstanding piece, the card still tends to fly out of the card connector easily as a result of weak card holding force. Furthermore, the shielding shell is stamped to form two separate pieces as being the withstanding piece and the blocking elastic piece, and therefore, the shielding shell is complicated, resulting in high manufacturing cost.

Hence, an electrical card connector correctly and smoothly ejecting the card is desired.

SUMMARY OF THE INVENTION

Accordingly, an object of the present invention is to provide an electrical card connector correctly and smoothly ejecting the card.

To achieve the above object, an electrical card connector, used for receiving a card having a cutout, includes an insulating housing, a plurality of conductive contacts retained in the insulating housing, a metal shield covering the insulating housing to define a card receiving room, and an ejector assembled on the insulating housing. The ejector includes a slider, a spring member, and a pin member for cooperatively guiding/ejecting the card. The electrical card connector further includes a half lock elastic piece and a flexible piece both secured to the slider of the ejector. The half lock elastic piece partly extends toward the card receiving room for engaging with the card. The flexible piece has a wing portion pressing against the half lock elastic piece from an opposite side relative to the card receiving room throughout the card's insertion/ejection.

Other objects, advantages and novel features of the invention will become more apparent from the following detailed description when taken in conjunction with the accompanying drawings.

DETAILED DESCRIPTION OF THE PREFERRED EMBODIMENT

Figure 1:
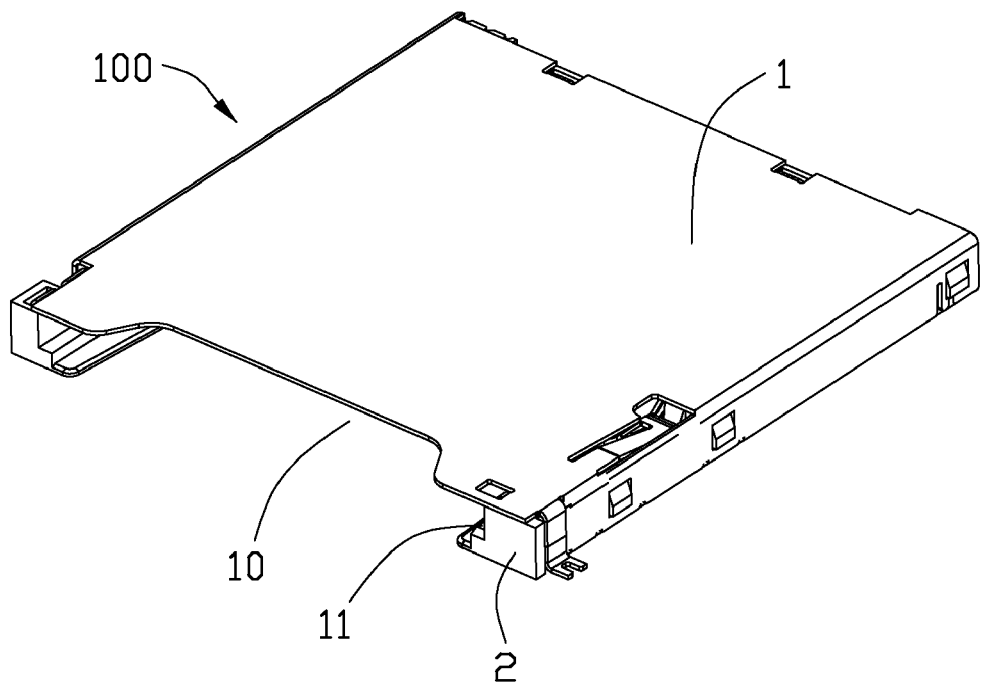
FIG. 1 is a perspective, assembled view of an electrical card connector constructed in accordance with the present invention.

Referring to FIGS. 1-4, an electrical card connector 100 of the present invention used for receiving a card (not shown) having a cutout (not shown) at a lateral edge thereof, comprises an insulating housing 2, a plurality of conductive contacts 3 retained in the insulating housing 2, and a metal shield 1 covering the insulating housing 2 for defining a card receiving room 10 therebetween. The card receiving room 10 has a card inserting port 11 opening in the air at a back end thereof. Therefore, the end opposite to the card inserting port 11 is defined as a front end of the electrical card connector 100. The electrical card connector 100 further comprises a card detecting terminal (not labeled) fore detecting whether the card is fully inserted in the electrical card connector 100 or not, and a read-and-write terminal (not labeled) determining whether the signals of the card are read out or written in or not. How the card detecting terminal and the read-and-write terminal act are well known by persons skilled in the art, and it is not described in detail hereafter.

Figure 3:
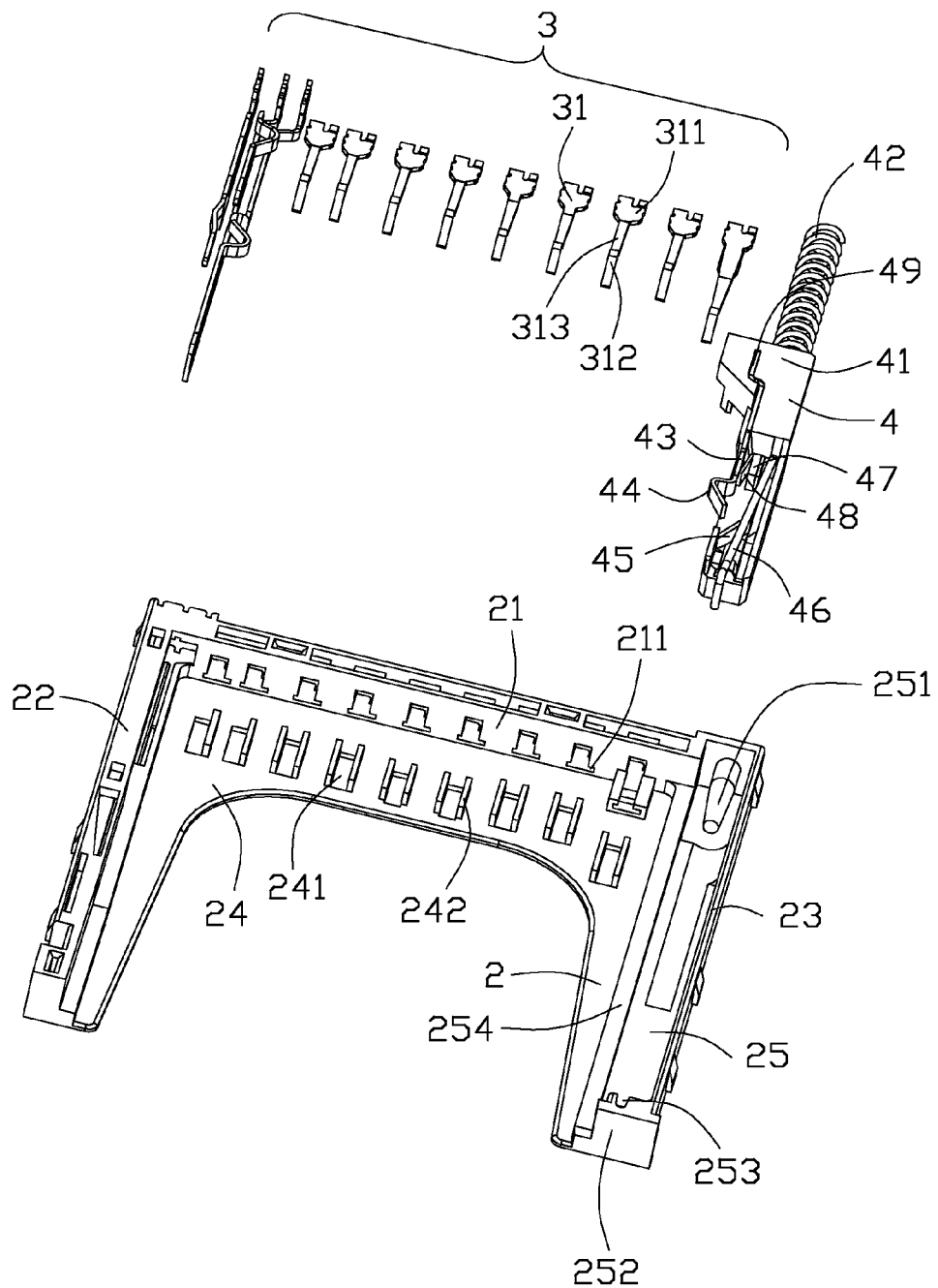
FIG. 3 is a perspective, partly exploded view of FIG. 2 not showing the metal shield.

Referring to FIG. 3, the insulating housing 2 comprises an elongate base portion 21 and a pair of lateral walls 22, 23 extending backwardly from two ends of the base portion 21. The insulating housing 2 further comprises a plate portion 24 connecting with inner edges of the base portion 21 and the lateral walls 22, 23 substantially surrounding as a "U" figure, with an opening facing towards the card inserting port 11. The base portion 21 defines a row of cutouts 211 therein, and the plate portion 24 defines a row of passageways 241 aligned with the cutouts 211. The card detecting terminal and the read-and-write terminal are both assembled on the left lateral wall 22. The right lateral wall 23 defines a slot 25 besides the card receiving room 10 and distinguishing from the card receiving room 10 by virtue of a barrier 254. The base portion 21 forms a column 251 extending backward to be located above the right lateral wall 23. The back end of the right lateral wall 23 opposite to the column 251 is formed as a block wall 252. The right wall 23 further defines a slit 253 adjacent to the block wall 252.

Figure 2:
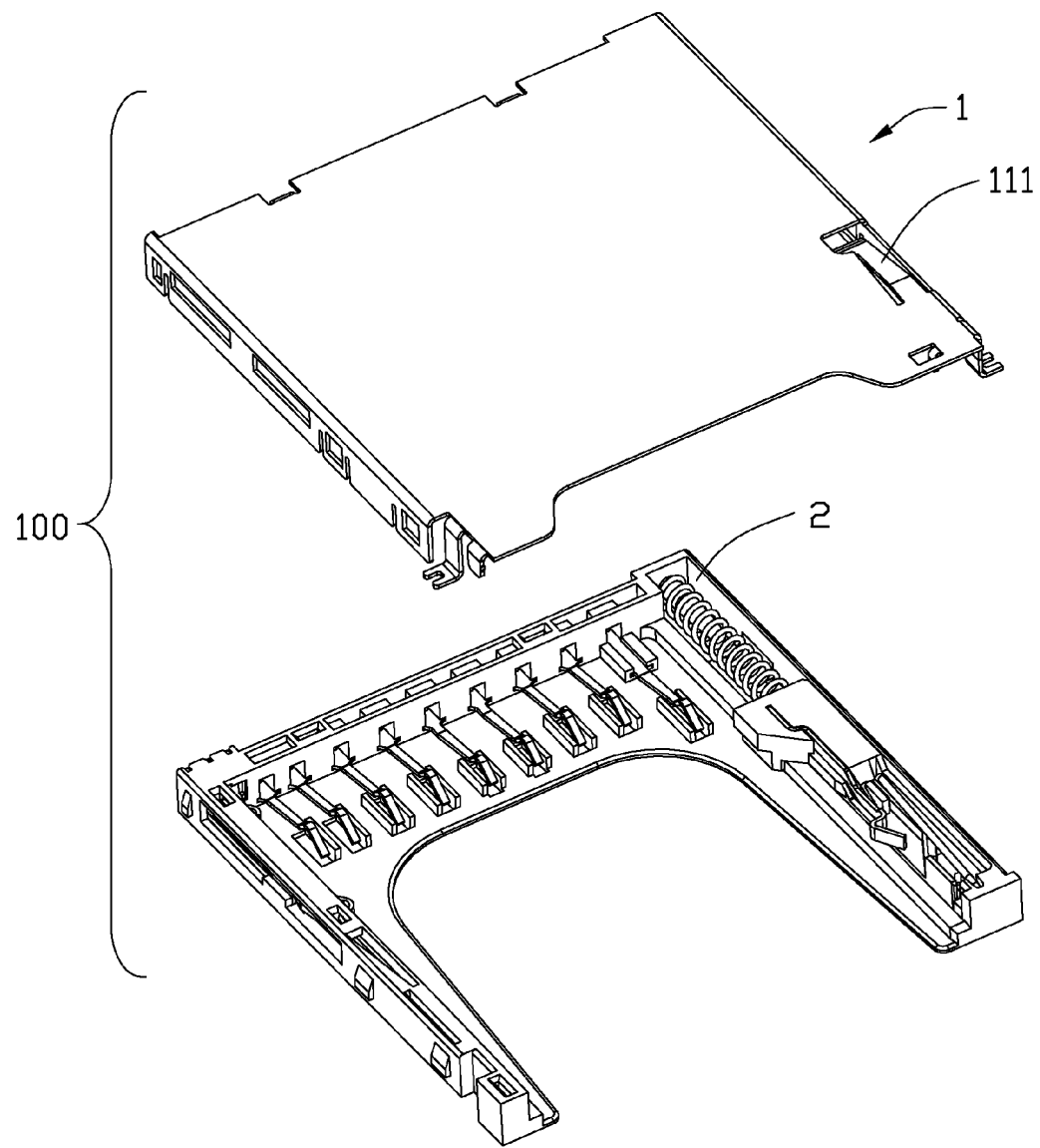
FIG. 2 is a perspective, partly exploded view of the electrical card connector of FIG. 1.

Referring to FIG. 2, the metal shield 3 is frame configured and has an elastic beam 111 extending obliquely, downwardly towards the card receiving room 10.

Referring to FIG. 3, the conductive contact 3 comprises a retaining portion 311, a contacting portion 312, and a jointing portion 313 connecting with the retaining portion 311 and the contacting portion 312. The retaining portion 311 is retained in the cutout 211 of the insulating housing 2 for retaining the conductive contact 3 in the insulating housing 2. The contacting portion 312 extends into the card receiving room 10, cantileverly located beyond the passageway 241 to contact the conductive trace of the card. When the card is inserted, the passageway 241 provides enough space for the contacting portion 312 to move down.

Figure 4:
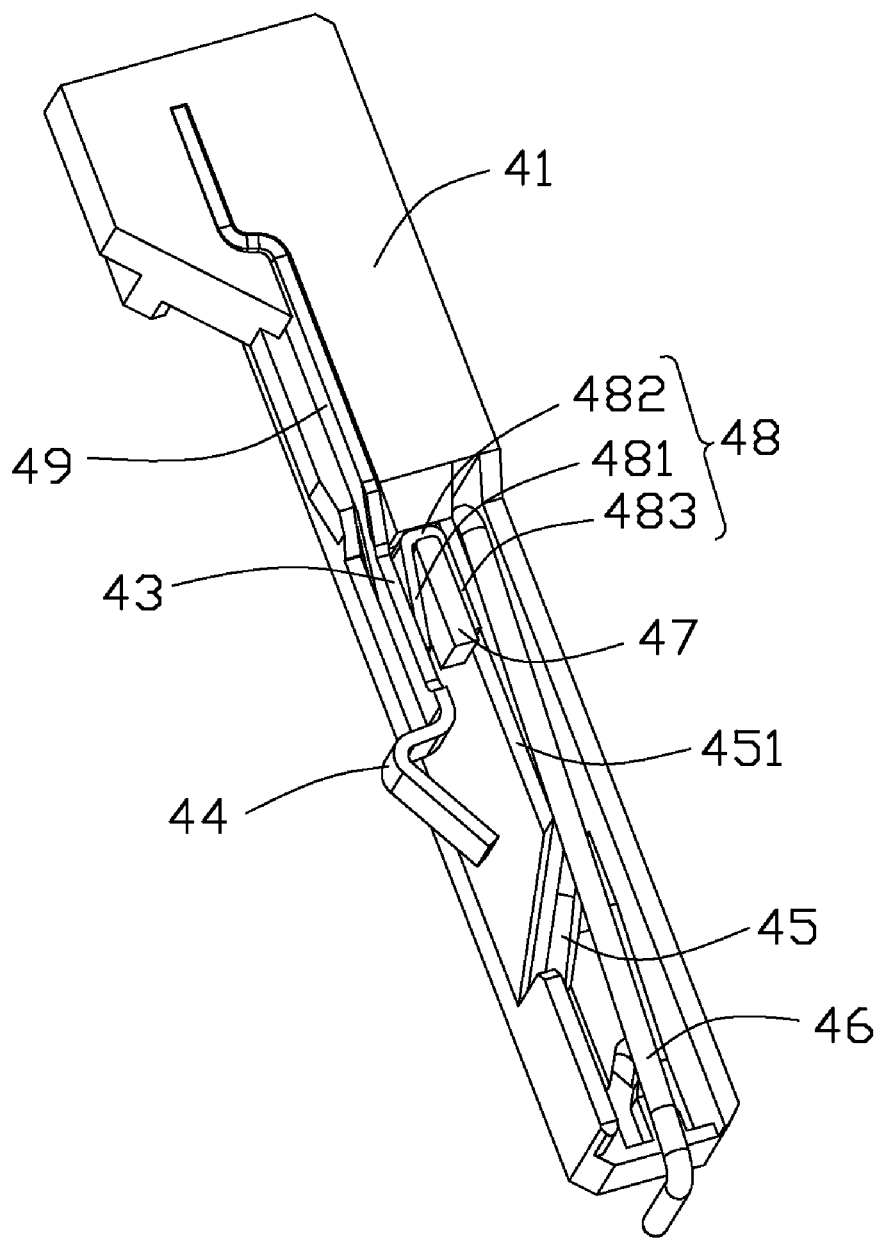
FIG. 4 is a perspective, assembled view of the ejector.

Referring to FIGS. 3 and 4, the ejector 4 comprises a slider 41, a spring member 42 and a pin member 46. The slider 41 defines a heart shaped slot 45 in a back part thereof. One end of the spring member 42 is oriented by the column 251 and the other end of the spring member 42 is conflicted with the front end of the slider 41, compressed by the slider 41 for biasing the movement of the slider 41. The pin member 46 is a shaft one, with one end thereof locked in the slit 253 of the insulating housing 2, and the other end thereof received in as well as moveably sliding along the heart-shaped slot 45 during the card's insertion/ejection. The slider 4 defines a recess 49. A half lock elastic piece 43 is partly secured to the recess 49. The half lock elastic piece 43 has a hook portion 44 extending beyond the slider 41 towards the card receiving room 10, used for locking with the cutout of the card. The heart-shaped slot 45 is much farther away from the card receiving room 10 than the half lock elastic piece 43. The slider 41 forms a post 47 in a middle part thereof. The post 47 is arranged between the half lock elastic piece 43 and the heart-shaped slot 45. The ejector 4 further comprises a metallic, preformed flexible piece 48 peripherally encircling the post 47. A stopper wall 451 is formed closing to the heart-shaped slot 45. The flexible piece 48 is fixed between the half lock elastic piece 43 and the stopper wall 451. The flexible piece 48 is a long strip, which is performed aforehand. The flexible piece 48 comprises a first wing portion 481, a second wing portion 483 and a connecting portion 482 curvedly connecting the first wing portion 481 and the second wing portion 483. The second wing portion 483 passes around the post 47 and leans against the stopper wall 451 for orientating the flexible piece 48 with respect to the slider 41. The first wing portion 481 is arranged between the half lock elastic piece 43 and the post 47, leaning against the half lock elastic piece 43 continuously during the card's insertion/ejection.

Referring to FIGS. 1-4, because the half lock elastic piece 43 and the flexible piece 48 are both assembled to the slider 41, they are steady with respect to each other during the card's insertion/ejection. The first wing portion 481 of the flexible piece 48 always provides pressures to the half lock elastic piece 43 such that the card is prevented from abnormal breaking away. The card is also prevented from flying out of the card connector 100 when the card is in ejecting process. Because the flexible piece 48 is preformed as a long strip, it is manufactured easily and assembled easily. The manufacturing cost of the product of the present invention is reduced, accordingly. The flexible piece 48 of a substantially "V" shape is not limiting. The second wing portion 483 is just bent for fixing the conflicting piece 48. A flexible piece 48 having only the first wing portion 481 leaning against the half lock elastic piece 43 and could be fixed with respect to the slider 41 in an alternative embodiment is just all right. The elastic beam 111 of the metal shield 1 presses against the pin member 46 for preventing the pin member 46 from jumping out of the heart-shaped slot 45 during the card's insertion/ejection.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electrical card connector, used for receiving a card having a cutout, comprising:
an insulating housing;
a plurality of conductive contacts retained in the insulating housing;
a metal shield covering the insulating housing to define a card receiving room;
an ejector assembled on the insulating housing, the ejector comprising a slider, a spring member, and a pin member for cooperatively guiding/ejecting the card;
a half lock elastic piece partly secured to the slider of the ejector and partly extending toward the card receiving room for engaging with the card; and
a flexible piece assembled on the slider of the ejector, having a wing portion pressing against the half lock elastic piece from an opposite side relative to the card receiving room throughout the card's insertion/ejection; wherein
the flexible piece is arranged farther away from the card receiving room than the half lock elastic piece; wherein
the slider defines a heart-shaped slot where the pin member slides along, and the flexible piece is arranged between the half lock elastic piece and the heart-shaped slot; wherein
the slider forms a post between the half lock elastic piece and the heart-shaped slot, and the flexible piece peripherally encircling the post; and wherein
the slider forms a stopper wall beside the heart-shaped slot and the flexible piece comprises a second wing portion passing around the post and leaning against the stopper wall.

2. The electrical card connector as described in claim 1, wherein the half lock elastic piece and the flexible piece keep moving together with the slider thus the flexible piece is immovable relative to the half lock elastic piece along the card insertion direction.

3. The electrical card connector as described in claim 1, wherein the flexible piece is a metallic, performed strip.

4. The electrical card connector as described in claim 1, wherein the metal shield comprises an elastic piece pressing against the pin member during the card's insertion/ejection.

5. The electrical card connector as described in claim 1, wherein each conductive contact comprises a retaining portion and a contacting portion extending from the retaining portion towards the card receiving room.

6. The electrical card connector as described in claim 5, wherein the insulating housing defines a plurality of cutouts and the retaining portions of the conductive contacts are retained in the cutouts.

7. The electrical card connector as described in claim 6, wherein the insulating housing defines a plurality of passageways and the contacting portions of the conductive contacts are cantileverly located above the passageways.

8. An electrical card connector, used for receiving a card having a side notch, comprising:
an insulating housing;
a plurality of conductive contacts retained in the insulating housing;

a metal shield covering the insulating housing to define a card receiving room;

an ejector assembled on the insulating housing, the ejector comprising a slider, a spring member, and a pin member for cooperatively guiding/ejecting the card; and a half lock elastic piece partly secured to the slider of the ejector and partly extending toward the card receiving room for engaging with the card; wherein said half lock elastic piece defines a locking head for reception within the side notch, a rear fixed supporting point functioning as fulcrum about which said half lock elastic piece essentially is outwardly deflected during insertion/withdrawal of the card, and a front free supporting point located, adjacent to said locking head, where an additional support is moveable along with the front free supporting point when the locking head is outwardly moved due to insertion/withdrawal of the card; wherein said additional support is implemented by a flexible piece constantly inwardly engaged with the half lock elastic piece adjacent the locking head; and wherein said flexible piece is essentially located transversely between the pin member and half lock elastic piece when said slider is moved to an outer position where the card is ready to be loaded/unloaded.

* * * * *